US006530598B1

(12) United States Patent
Kirby

(10) Patent No.: US 6,530,598 B1
(45) Date of Patent: Mar. 11, 2003

(54) ANTI-TIP DEVICES FOR WHEELED CONVEYANCES INCLUDING WHEELCHAIRS AND METHOD RELATED THERETO

(76) Inventor: Ronald Lee Kirby, 2425 Armcrescent East, Halifax, Nova Scotia (CA), B3L 3E2

(*) Notice: Subject to any disclaimer, the term of this patent is extended or adjusted under 35 U.S.C. 154(b) by 0 days.

(21) Appl. No.: 09/302,140

(22) Filed: Apr. 29, 1999

(51) Int. Cl.[7] .................... B60R 21/00
(52) U.S. Cl. .................... 280/755; 280/647; 280/650
(58) Field of Search .............. 280/47.131, 47.16–47.18, 280/47.25, 47.2, 47.38, 647, 650, 755

(56) References Cited

U.S. PATENT DOCUMENTS

| | | | | | |
|---|---|---|---|---|---|
| 900,077 | A | | 10/1908 | Barnickle | |
| 3,256,040 | A | | 6/1966 | Mize et al. | |
| 3,580,591 | A | | 5/1971 | Coffey et al. | |
| 3,848,883 | A | | 11/1974 | Breacain | |
| 4,154,452 | A | | 5/1979 | Newman | |
| 4,500,102 | A | | 2/1985 | Haury et al. | 280/242 |
| 4,515,383 | A | | 5/1985 | Minnebraker | |
| 4,565,385 | A | | 1/1986 | Morford | |
| 4,572,577 | A | | 2/1986 | LaRue | |
| 4,772,037 | A | | 9/1988 | Jones | |
| 4,811,964 | A | * | 3/1989 | Horn | 280/650 |
| 4,877,260 | A | | 10/1989 | Howland | |
| 4,934,725 | A | | 6/1990 | Owens | |
| 5,137,295 | A | | 8/1992 | Peek | |
| 5,143,391 | A | | 9/1992 | Robertson et al. | |
| 5,181,733 | A | | 1/1993 | Tague | |
| 5,316,328 | A | | 5/1994 | Bussinger | |
| 5,330,221 | A | | 7/1994 | Sutton | |
| 5,421,598 | A | * | 6/1995 | Robertson et al. | 280/650 |
| 5,564,512 | A | | 10/1996 | Scheulderman | |
| 5,848,658 | A | | 12/1998 | Pulver | |
| 5,944,131 | A | | 8/1999 | Schaffner et al. | |

FOREIGN PATENT DOCUMENTS

| | | |
|---|---|---|
| DE | 92 17 764.6 | 4/1993 |
| EP | 0 908 166 A2 | 4/1999 |
| FR | 2 464 7106 | 3/1981 |
| WO | WO 93/24342 | 12/1993 |
| WO | WO 98/02122 | 1/1998 |
| WO | WO 00/12040 | 3/2000 |

OTHER PUBLICATIONS

H. F. Coffey, M.D.; Drop–Back Dolly for a Wheelchair; Archives of Physical Medicine and Rehabilitation; Dec. 1967; 48 (12):672–4.

(List continued on next page.)

*Primary Examiner*—Lesley D. Morris
*Assistant Examiner*—L. Lum
(74) *Attorney, Agent, or Firm*—David G. Conlin; William J. Daley, Jr.; Edwards & Angell, LLP

(57) ABSTRACT

Featured is an anti-tip device for regulating the amount of allowable tilting for an apparatus, such as a wheeled conveyance including a wheelchair, in one of a backward, forward or sideways direction. The anti-tip device includes a housing that is secured to the frame or support structure of the apparatus, in which housing is rotatably secured a support arm. The housing is configured so the support arm is in either a rest position or an operable position. The rest position generally corresponds to the non-tilted condition of the apparatus and in the operable position, the housing engages the support arm. Engagement of the support arm with the housing coupled with the distal end being in contact with the support surface prevents further rotation of the support arm and thus further tilting of the apparatus. When the apparatus is tilted in one of a backwards, forward or sideways direction, the support arm automatically rotates within the housing out of the rest position responsive to this tilting of the apparatus. The housing further includes a tilt-adjusting mechanism that selectively adjusts the angular distance between the rest position and the operable position and thus regulates the amount of tilting. In a specific embodiment, the adjusting mechanism comprises a cam that is rotatably mounted with the housing so a surface thereof contacts a surface of the support arm when it is in the operable position.

24 Claims, 10 Drawing Sheets

OTHER PUBLICATIONS

R. Lee Kirby, M.D. et al.; Wheelchair Stability and Maneuverability: Effect of Varying the Horizontal and Vertical Position of a Rear–Antitip Device; Arch Phys Med Rehabil; vol. 75. May 1994.

Designed to Win! Impact; Colours 'N motion!; Anaheim, CA; Colours 'N motion product brochure.

Positioning Redefined. Tarsys Tilt and Recline Systems; Genus Medical Inc.; Genus Medical product brochure.

Quickie P200; Quickie product brochure; Sunrise Medical Quickie Designs Inc. (1994).

Technically Speaking, '97 Solutions Student Design Competition; Aug. 1997.

Wheelchair Anti–Tip Levers; Rehabilitation Manufacturing Services LTD.; Rehabilitation Manufacturing Service product brochure.

Device to Assist Training in Balancing on the Rear Wheels of a Wheelchair; Physical Therapy; vol. 64, No. 5; May 1984.

* cited by examiner

ANTI-TIP DEVICES FOR WHEELED CONVEYANCES INCLUDING WHEELCHAIRS AND METHOD RELATED THERETO

FIELD OF INVENTION

The present invention relates to anti-tip devices for wheeled conveyances such as wheelchairs, wheeled conveyances including such anti-tip devices and more particularly to wheelchairs using such anti-tip devices that control forwards, sideways and backwards tipping and methods related thereto.

BACKGROUND OF THE INVENTION

The wheelchair is one of the most important therapeutic devices in rehabilitation, as well as being a well known transportation appliance that enables an infirm, disabled and/or unwell person to move about with greater mobility than they would otherwise be able to do. A conventional wheelchair typically includes a frame, two rear wheels of large diameter and two forward wheels of smaller diameter, a seat and backrest. The seat and backrest are disposed on and secured to the frame so as to form a chair-like structure. The seat can be a padded seat, a solid seat, a sling seat or a seat comprised of webbing. The wheels, seat, and backrest typically are configured and arranged on the support frame so the greater part of the weight of the wheelchair occupant is resting on the rear wheels.

A number of studies have been performed concerning wheelchair safety. These studies have reported occurrences of acute injuries that were serious enough to cause the injured person to seek emergency medical attention and in some cases resulted in fatalities. Although there are a number of causes for such accidents, in a majority of cases the stability of the wheelchair, or the lack thereof, was a factor.

One very common hazard when using wheelchairs is that of tipping over backwards (i.e., rear-tipping accidents). Rear-tipping accidents typically occur when a wheelchair user leans backward, rapidly accelerates forward, wheels up an incline or strikes a low obstacle while wheeling backwards, particularly if the user's center of mass is higher and farther back than usual, such as is the case with users who do not have legs. The reaction to the torque applied to the rear wheels provides a considerable tendency to tipping. When there is any additional factor such as going up a ramp, a hill or a curb, the risk of rear tipping increases further. Other tipping accidents include those in which the wheelchair tips forward or sideways.

As to rear-tipping accidents, many wheelchair manufacturers provide rear anti-tip devices to help limit the extent of rear tipping as an option for the wheelchair. These devices typically comprise rearwardly extending structures, with or without wheels, that prevent more than a minimal amount of rearward tilting. These structures, however, cause problems at the lower end of inclines much like scrapping the rear undercarriage of a car when starting up a steep driveway, in other words, they limit the departure angle of the wheelchair. Also, to the extent that such structures protrude beyond the rearmost aspect of the rear wheels, they tend to make the wheelchair unwieldly in close-quarters maneuvering such as in elevators, hallways, and with crowds of people. A low departure angle also prevents a wheelchair from being tipped back sufficiently to allow the front wheels or casters to clear obstacles such as curbs or so the wheelchair could be pushed over rough round. Such devices are shown for example in U.S. Pat. Nos. 3,848,883, 5,143,391 and 4,565,385.

In sum, to increase stability using such types of anti-tip devices, the device is designed so as to minimize or decrease the departure angle. When this is done, however, then the wheelchair becomes more unwieldly to use. As a result, the anti-tip devices are not used or are configured by the user in some cases so as to form some sort of compromise between stability and the usability or maneuverability of the wheelchair.

Other rear anti-tip devices have been developed that are only put into an operable condition upon some action by the user or by a third party. Until the anti-tip device is put into the operable condition, the device is not effective in minimizing or preventing the wheelchair from tipping over such as in a backwards or forward direction. When the anti-tip device is put into its operable condition, then the device either is subject to the same limitations of other rear anti-tip devices, as described hereinabove, or the operable condition of the anti-tip device effectively renders the wheelchair immobile. Examples of such devices are illustrated in U.S. Pat. Nos. 4,877,260, 5,181,733, 5,564,512, and 5,137,295.

It also is highly desirable for some wheelchair users to develop and master the skill of performing a wheelie when doing certain tasks. The wheelie is a highly useful skill that enables the wheelchair user, for example, to overcome a number of environmental obstacles such as climbing and descending curbs and ramps and turning in tight spaces.

With a conventional wheelchair, a wheelie involves the wheelchair user lifting the front wheels or casters off the floor so that the combined center of gravity of the user and the wheelchair (minus the rear wheels) is balanced over the rear axle. To "pop" a wheelie, the user accelerates the wheelchair forward while leaning backwards. The user maintains the wheelie by applying corrective forward and backward forces to the rear wheels with the hands or by shifting or altering body position.

Many users of conventional wheelchairs are leery of learning this skill, because of the large risk of completely tipping backwards and of striking one's head on the floor, surface or an object, when performing or attempting to perform a wheelie. Also, many clinicians are reluctant to teach such a maneuver because of this risk. As a result, only a minority of wheelchair users do learn how to perform a wheelie.

As indicated above, to perform a wheelie, the wheelchair user must tilt the wheelchair backwards. However, the above-described rear anti-tip devices are configured so as to minimize the amount of rear tilting by the wheelchair. As such, a wheelie usually cannot be performed with a wheelchair that includes such anti-tip devices or structures. This is so because those devices or structures that maintain stability by limiting the departure angle, as a practical matter prevent a user from establishing the conditions needed for the user to "pop" a wheelie.

There is described in Physical Therapy, Volume 64, No. 5 an aid or device to assist training in balancing on the rear wheels of a wheelchair, what the article refers to as an advanced wheelchair skill and commonly known as a wheelie. The described device consists of two thick steel bars that are each bent in the form of a modified U. Each of the two ends of each bar is equipped with a screw collar clamp. Also, each bar is attached to the rear of the wheelchair by means of the screw clamp collars at two points, the rear upright and the tip bar of the wheelchair. In addition, small rollers are affixed to the terminal bend of each bar.

The article also acknowledges and identifies some shortcomings for the device. In addition to use-related shortcomings, the article provides that the device (i.e., the two bars comprising the device) presents a significant hazard to those walking behind the wheelchair and also increases the turning area required for the wheelchair. It is further provided therein that when the client has attained a certain level of proficiency and confidence the training aid or device is removed, thus the device has limited utility.

It thus would be desirable to provide an anti-tip device that would provide the desired stability to prevent or minimize the risk for completely tipping an apparatus such as a wheelchair in a rearwards direction, yet not result in a corresponding decrease in the maneuverability or usability of the apparatus or wheelchair. It also would be desirable to provide an anti-tip device that is easily adaptable for use to prevent or minimize the risk of tilting in at least one of a forward, rearward or sideways direction. It would be particularly desirable to provide such a device where the wheelchair user could regulate the maximum amount of tilting that is to be allowed as well as a device in which the mechanism for increasing stability and regulating tilting is self-actuating. Further, it would be desirable to provide an anti-tip device that would allow a user to "pop" a wheelie at any time and yet protect the user from excessive rear tilting during such maneuvers as well as at any other time. It also would be desirable to provide such a device that would increase the maneuverability of the wheelchair as compared to wheelchairs configured with prior art anti-tip devices. Anti-tip devices of the present invention preferably would be simple in construction as compared to prior art devices and would not require highly skilled users to utilize the device.

SUMMARY OF THE INVENTION

The present invention features an anti-tip device for regulating the amount of allowable tilting for an apparatus, such as a wheeled conveyance including a wheelchair, in one of a backward, forward or sideways direction. Also featured is such an anti-tip device in combination with a wheeled conveyance and more particularly, a wheelchair including such an anti-tip device. Such an anti-tip device is advantageously configured so it automatically deploys from its stored or rest position into an operable position responsive to the tilting motion of the apparatus or wheeled conveyance in the direction to be regulated.

Such an anti-tip device, when used in conjunction with a wheelchair, also advantageously minimizes the risk of a wheelchair user overturning the wheelchair while not otherwise causing an interference or impediment to the maneuverability of the wheelchair. Further, such a device advantageously allows a user to "pop" a wheelie at any time and still minimizes the risk to the user of overturning the wheelchair in a backwards direction while performing the wheelie or at any other time.

In addition, such an anti-tip device allows a wheelchair user to tilt the wheelchair backwards so the user is supported by the anti-tip device, preferably two such devices, and the wheelchair rear wheels. Such a condition or operational position of the wheelchair is hereinafter referred to as a "wheelie$^{+}$". This rear-tilted arrangement of the wheelie$^{+}$ is advantageous because it may be helpful in reducing postural neck strain from looking up to make eye contact with a standing person(s). The wheelie$^{+}$ position also may be helpful in reducing the likelihood of pressure sores caused by sitting upright for long periods of time. Wheelchair users can use the wheelie$^{+}$ to achieve most of the benefits of a conventional wheelie in overcoming obstacles. The wheelie$^{+}$ is much easier for users to learn than the conventional wheelie.

In a first aspect of the present invention, the anti-tip device includes a housing that is secured to the frame or support structure of an apparatus such as a wheel-chair or other wheeled conveyance, in which housing is rotatably secured a support arm. The housing is configured so the support arm is in either a rest position or an operable position. The rest position generally corresponds to the non-tilted condition of the apparatus such as the upright position of a wheelchair. When in the operable position, the housing engages the support arm so as to prevent further rotation of the support arm with respect to the housing.

When the apparatus is tilted in one of a backwards, forward or sideways direction, the support arm rotates within the housing out of the rest position responsive to this tilting of the apparatus. When the apparatus tilts a predetermined amount, the support arm is rotated so it is in the operable position. In the operable position, a distal end of the support arm is in contact with a support surface, such as a floor. Thus, the engagement of the support arm with the housing when in the operable position coupled with the distal end being in contact with the support surface thereby prevents further tilting of the apparatus. Thus, the maximum amount of tilting that is to be allowed for the apparatus is regulated by the amount of rotation by the support arm into the operable position.

More specifically, when the apparatus is tilted a first amount, an amount less than that required to place the support arm in the operable position, the distal end of the support arm comes into contact with the support surface. As the apparatus is tilted further the support arm continues to rotate within the housing until the support arm engages a portion of the housing thereby stopping further rotation and thus putting the support arm in the operable position.

In specific embodiments, the housing of the anti-tip device further includes a tilt-adjusting mechanism that selectively adjusts (i.e., increases or decreases) the angular distance between the rest position and the operable position. Adjusting this angular distance correspondingly regulates the amount of tilting. For example, if the angular distance is increased, the support arm can rotate through a longer arc and thus increase the maximum amount of tilting that can be achieved by the apparatus. Similarly, if the angular distance is decreased, then the support arm rotates through a smaller arc and thus the maximum amount of allowable tilting is thereby decreased.

In a first embodiment of the anti-tip device, the adjusting mechanism comprises a cam that is rotatably mounted with the housing so a surface thereof contacts a surface of the support arm when it is in the operable position. Additionally, the adjusting mechanism includes a rotating mechanism, to which a cam is secured thereto, to selectively rotate the cam. In this way, a selected one of a plurality of cam surfaces is rotated into a position so the selected cam surface contacts the support arm surface when the arm is in the operable position. Thus, a user can adjust or regulate the amount of angular rotation (i.e., arc length) by the support arm between the rest position and the operable position and thus regulate the maximum amount of tilting.

In a second embodiment, the anti-tip device includes a pin member and the sides of the housing include a plurality of through apertures that are arranged so as to form a plurality of pairs of such apertures, where the pin member is selectively received and removably secured in one of the pairs of plurality of through apertures. The pairs of through apertures in conjunction with the pin member comprises another means for adjusting the angular distance of rotation for the support arm between the rest and operable positions.

In a third embodiment of the anti-tip device, the housing includes a threaded aperture positioned so one end thereof faces the area in which the support arm rotates within the housing. A threaded member is threadably received within the threaded aperture and is inserted therein such that one end thereof extends beyond the end of the through aperture facing the support arm. The threaded aperture in conjunction with the threaded member comprises another means for adjusting the angular distance of rotation for the support arm between the rest and operable positions.

In a second aspect of the invention, there is featured a wheelchair including at least one such an anti-tip device and preferably a plurality of such devices to regulate the maximum amount of allowable tilting the wheelchair can achieve in one of a forward, sideways or rearward direction.

In a third aspect of the invention, there is featured a wheeled conveyance having at least one rear wheel and a support frame in combination with an anti-tip device according to the present invention that regulates the maximum amount of allowable tilting the wheeled conveyance can achieve. The wheeled conveyances include but are not limited to unicycles, bicycles, tricycles and un-powered or powered vehicles having four or more wheels.

In a fourth aspect of the present invention, the distal end of the support arm is configured so a wheel or another type of rotating member extends therefrom. Thus, for example, a wheelchair user can easily move the wheelchair about in the wheelie$^+$ position even though the wheelchair is tilted backwards and the support arm deployed in the operable position where the wheel at the distal end is in contact with the support surface. In particular embodiments, the wheel at the distal end is castered or otherwise configured so it can swivel about a vertical axis at the support arm distal end for increased mobility. In particular, the wheel at the distal end is configured so the wheelchair user can pivot the wheelchair about an axis generally perpendicular to the support surface even though the wheelchair and the user are being supported by the extended wheel of the anti-tip device and the wheelchair rear wheels.

Alternatively, the support arm distal end is configured so as to include a plurality of wheels. The distal end also can be configured so as to include a secondary support structure for the plurality of wheels. For example the distal end can be configured with U shaped structure to which the plurality of wheel are rotatably, and preferably swively, mounted.

Other aspects and embodiments of the invention are discussed below.

BRIEF DESCRIPTION OF THE DRAWING

For a fuller understanding of the nature and desired objects of the present invention, reference is made to the following detailed description taken in conjunction with the accompanying drawing figures wherein like reference characters denote corresponding parts throughout the several views and wherein.

DESCRIPTION OF THE PREFERRED EMBODIMENT

Figure 1A:
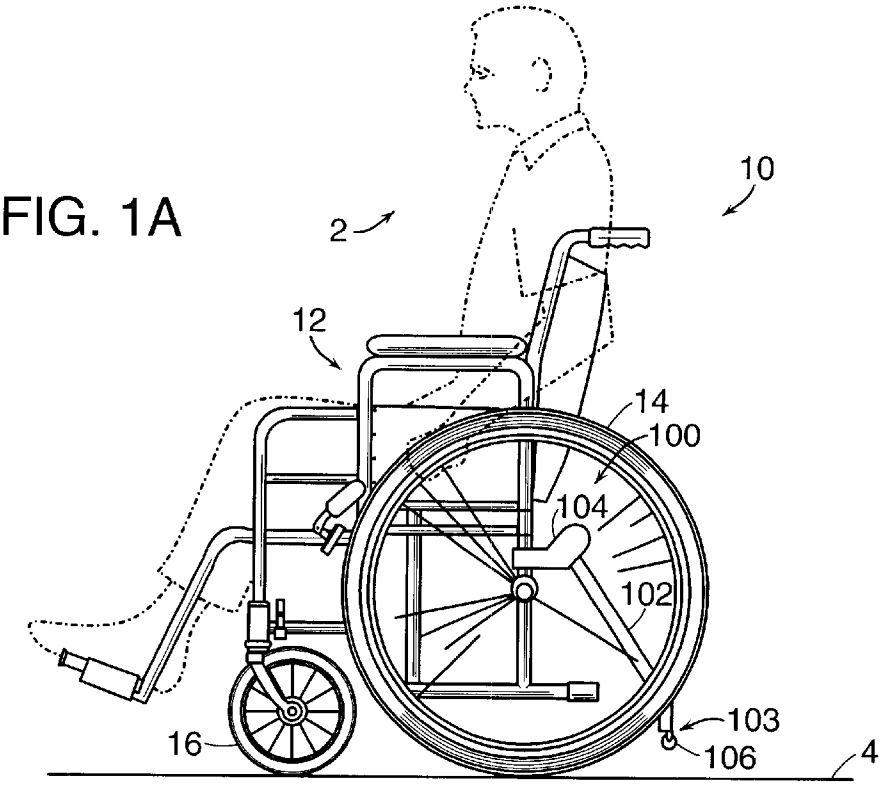
FIG. 1A is a side view of a wheelchair having a rearwardly extending anti-tip device according to the present invention, when the wheelchair is in the upright position.
Figure 2A:
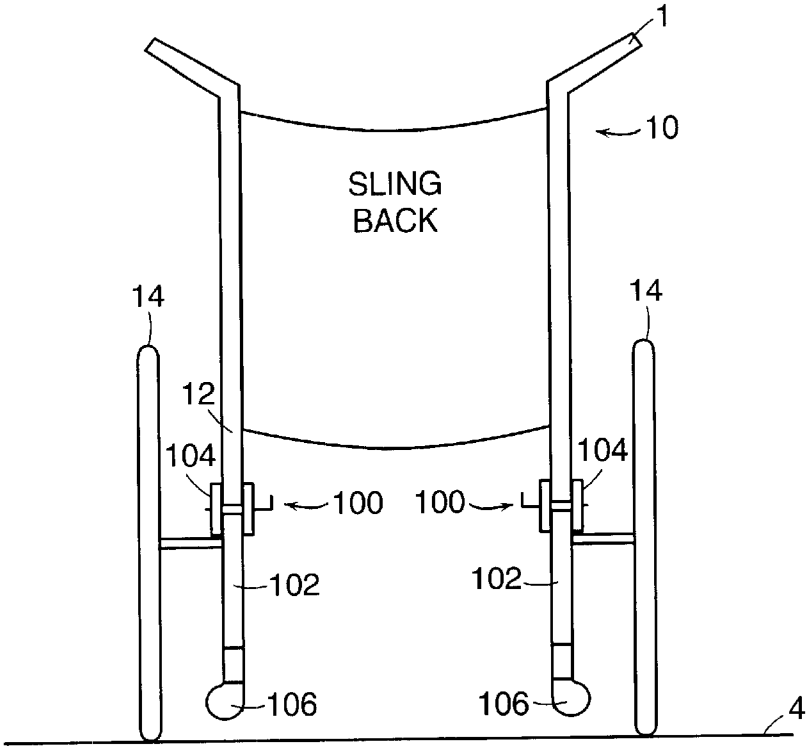
FIG. 2A is a rear view of a wheelchair having two rearwardly extending anti-tip devices according to the present invention, when the wheelchair is in the upright position.

Referring now to the various figures of the drawing wherein like reference characters refer to like parts, there is shown in each of FIGS. 1A,B side views of a wheelchair 10 having at least one anti-tip device 100 being secured to a frame 12 thereof. As illustrated therein the anti-tip device 100 extends rearwardly so as to control or limit the maximum amount of tilting in a rearwards direction by the wheelchair 10. As shown in FIG. 2A, the wheelchair can be configured so as to include two such anti-tip devices 100 being spaced from each other and also extending rearwardly, the preferable arrangement as hereinafter described. Alternatively, and as shown in FIGS. 3–4, the at least one anti-tip device 100 is secured to the frame so as to control or limit the maximum amount of tilting in one of a forward or sideways direction by the wheelchair 10. Each of these applications is described and discussed in more detail hereinafter.

Figure 2B:
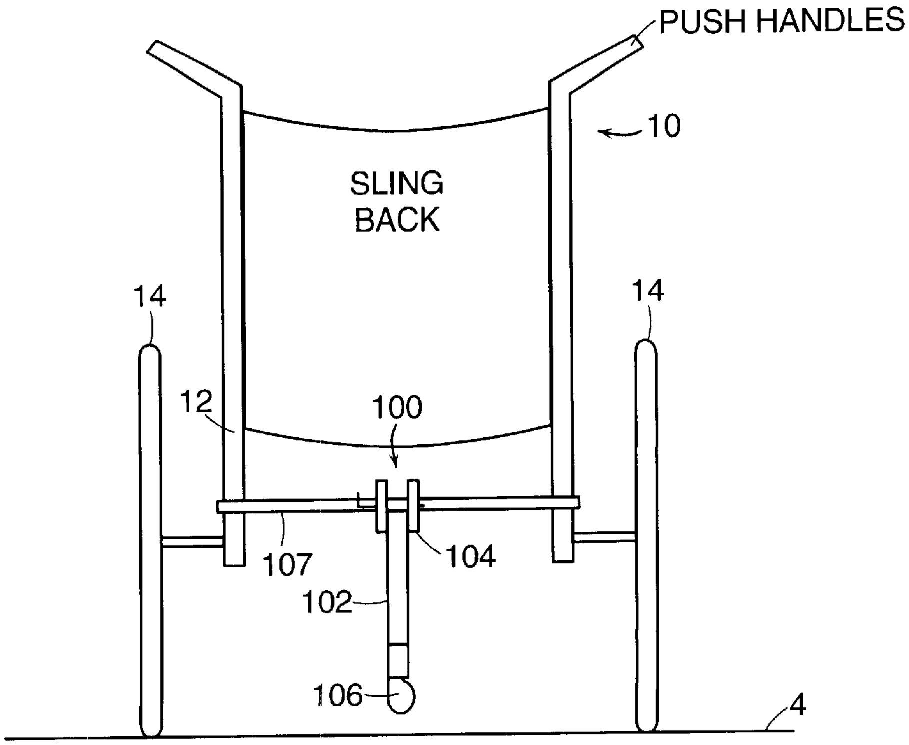
FIG. 2B is a rear view of a wheelchair having a centrally located rearwardly extending anti-tip device according to the present invention, when the wheelchair is in the upright position.

As provided above, FIGS. 1A,B and FIGS. 2A–B show the use of one or more anti-tip devices 100 to control or limit the maximum amount of rearwards tilting by the wheelchair 10. There is shown in FIG. 1A the wheelchair 10 and the occupant 2 thereof when in an upright position and where an arm, the anti-tipper arm 102, of the anti-tip device 100 is positioned in its rest position. The anti-tipper arm 102 preferably is configured so the distal end 103 of the anti-tipper arm 102 does not protrude beyond the rearmost aspects or position of the rear wheels 14 of the wheelchair when the anti-tipper arm is in the rest position.

In this way, the overall length of the wheelchair 10 is not increased nor is there an increase in the turning circle of the wheelchair. Also, the anti-tipping device 100 and more particularly the anti-tipper arm 102 does not pose an impediment to a user backing the wheelchair up to an object such as a wall. It also does not create a condition where the anti-tipper arm 102 can hit or trip a third party that may be behind or passing behind the wheelchair 10.

In addition, the anti-tipper arm 102 also is configured so the arm's distal end 103 is generally spaced from the support surface 4 or floor on which the rear and front wheels 14,16 of the wheelchair ride when the anti-tipper arm is in the rest position. More specifically, the anti-tipper arm is configured so the distal end 103 or the wheel(s) 106 located at the distal end is spaced a sufficient distance above the support surface 4 so the distal end or wheel(s) 106 thereat do not come into contact with a part of the support surface during most use of the wheelchair.

In an exemplary embodiment, the anti-tipper arm is configured such that the distal end 103 or the wheel(s) 106 thereat are spaced a distance from the support surface 4 that is about or above where the low points of the footrests for a wheelchair are located. More specifically, the anti-tipper arm is configured so the distal end 103 or wheel(s) 106 thereat are spaced about 5 cm or more from the support surface 4. In this way, the wheelchair 10 should not become stuck nor become tractionless because of an obstacle coming into contact with the anti-tipper arm 102 as the wheelchair moves in either the forward or backwards direction. Because the anti-tipper arm 103 is rotatably disposed within the housing, when the wheelchair 10 is moving forward, a collision between the anti-tipper arm distal end 103 and an obstacle should cause the anti-tipper arm to be rotated backwards and upwards out of the way in most, if not all cases.

Figure 1B:
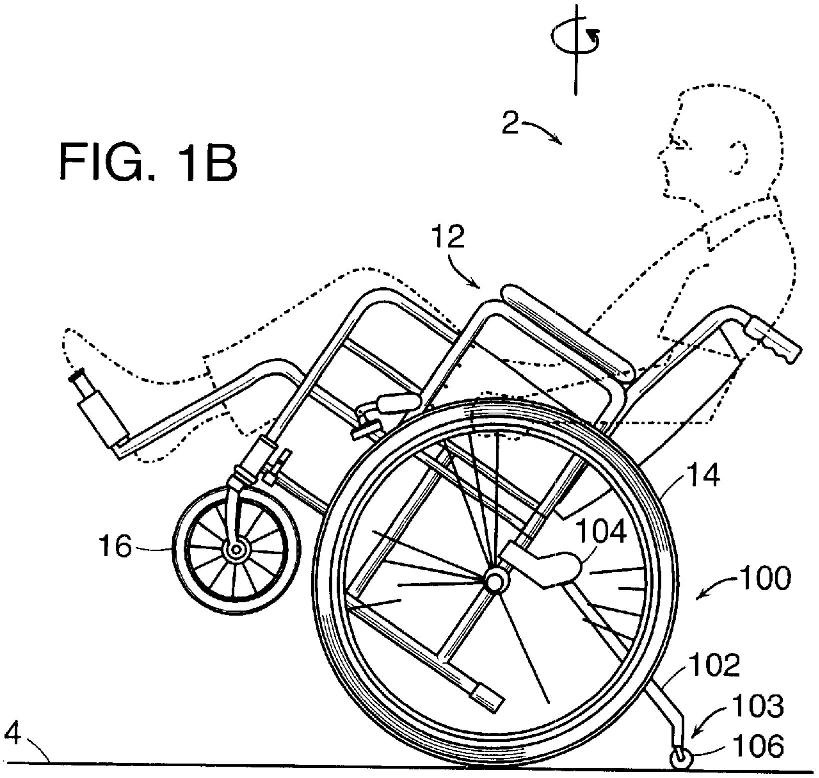
FIG. 1B is another side view of the wheelchair of FIG. 1A when the wheelchair is tilted backwards enough to actuate the anti-tip device.

There is shown in FIG. 1B, another side view of the wheelchair 10 and the occupant 2 thereof when the wheelchair is tilted backwards so the wheel 106 at the distal end 103 or the wheel(s) 106 thereat is in contact with the support surface 4. When in this condition or position, the anti-tipper arm 102 also is in the operable position and the distal end 103 of the anti-tipper arm 102 protrudes beyond the rearmost aspects or position of the rear wheels 14 of the wheelchair.

Preferably, the housing 104 is mounted to the wheelchair frame 12 so the axis of rotation of the anti-tipper arm 102 with respect to the housing is disposed above the axis of rotation for the wheelchair rear wheels 14.

As explained hereinafter, the anti-tipper arm 102 automatically rotates within the housing 104 of the anti-tip device 100 from the rest position to an operable position in response to the backwards tilting of the wheelchair 10. Preferably after the wheelchair 10 has tilted backwards a first amount, an amount less than that required to place the anti-tipper arm 102 in the operable position, the anti-tipper arm 102 or the wheel(s) 106 thereat contact the support surface 4. As the wheelchair 10 is tilted further, the anti-tipper arm 102 continues to rotate within the housing until the anti-tipper arm engages a portion of the housing thereby stopping further rotation and thus putting the anti-tipper arm in the operable position.

When the anti-tipper arm 102 is rotated into the operable position, further backwards tilting of the wheelchair 10 is prevented, because the distal end 103 or wheel 106 thereat is in contact with the support surface 4 and the anti-tipper arm is engaging the housing 104. When the anti-tipper arm 102 is in the operable position, the weight of the wheelchair 10 and its occupant 2 is supported and balanced upon the wheelchair rear wheels 14 and the distal end 103 or wheel(s) 106 thereat of the at least one anti-tip device 100. FIG. 1B also is illustrative of a wheelchair when it is in a wheelie$^+$ position.

Referring now to FIG. 2A, there is shown a wheelchair 10 including two anti-tip devices 100 in which the anti-tipper arms 102 therefor extend rearwardly. In this arrangement, the anti-tipper arms 102 of both anti-tip devices 100 rotate within the respective housing 104 responsive to the backwards tilting of the wheelchair 10 from the rest position to the operable position as described above for FIGS. 1A,B. The two anti-tip device 100 configuration illustrated in FIG. 2A, is preferable because it assures that a non-uniform rearwards tilting motion can be accommodated. In such cases, however, it also is desirable for each anti-tip device 100 to be designed so it alone can support the loads being imposed during the tilting motion and the load when the device and rear wheels are supporting the weight of the user and wheelchair.

In addition to providing anti-tip capability, the two-anti-tip device 100 that are attached to the wheelchair 10 can be utilized for cases where the wheelchair is being used in very narrow circumstances, for example the aisle of an airplane. In these cases or situations, many wheelchair travelers have a pair of transport wheels available so, when the rear wheels 14 are removed (i.e., many wheels have quick release devices for this), the wheelchair occupant 2 is movably supported by the front wheels 16 and the transport wheels. By removing the rear wheels, the wheelchair is narrowed a few inches in width so the wheelchair can travel in narrow situations or circumstances.

When using a wheelchair 10 configured with two anti-tip devices 100 as shown n FIG. 2A, however, the occupant need not use transport wheels. Instead, the anti-tip devices 100 can be arranged so as to provide the least amount of travel or arc between the rest and operable positions, corresponding to the least amount of tilting allowable. Thus, when the rear wheels 14 are removed such as when the wheelchair 10 is being used in narrow circumstances, the occupant would be movably supported upon the front wheels 16 and the wheel(s) 106 at the distal end 103 of the anti-tipper arm 102 for each anti-tip device 100.

Referring now to FIG. 2B, there is shown a wheelchair 10 including an anti-tip device 100 in which the anti-tipper arm 102 therefore extends rearwardly. In this arrangement, the anti-tip device 100 includes an intermediate support member 107, such as a tubular member, that is attached to and extends between the left and right rear vertical members of the wheelchair frame 12 and the housing 104 of the anti-tip device is secured thereto so the ant-tipper arm 102 also is centrally located.

For this alternate embodiment, the anti-tipper arm 102 rotates within the housing 104 responsive to the backwards tilting of the wheelchair 10 from the rest position to the operable position as described above for FIGS. 1A,B. When the anti-tipper arm 102 is in the operable position, the wheelchair 10 and its occupant 2 are supported and balanced upon the rear wheels 14 and the distal end 103 or wheel(s) 106 thereat of the single centrally located anti-tip device 100.

Figure 3A:
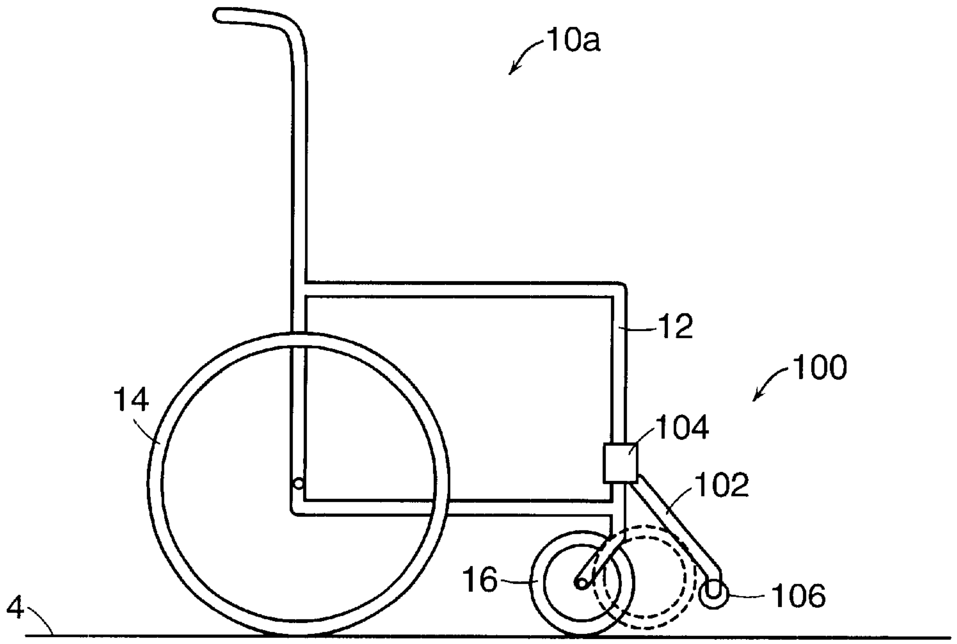
FIG. 3A is a side view of a wheelchair having a frontwardly extending anti-tip device according to the present invention, when the wheelchair is in the upright position.

As provided above FIGS. 3A,B show the use of one or more anti-tip devices 100 to control or limit the maximum amount of forwards tilting by a wheelchair 10*a*. There is shown in FIG. 3A the wheelchair 10*a* when in an upright position and where an arm, the anti-tipper arm 102, of the anti-tip device 100 is positioned in its rest position. Additionally, the housing 104 for each anti-tip device 100 is mounted to a vertical front member of the wheelchair frame 12 so the anti-tipper arm 102 for each device generally extends forwardly when in the rest position and so the anti-tipper arm rotates within the housing from the rest position to the operable position responsive to forward tilting of the wheelchair 10*a*.

Preferably, the housing 104 is mounted to the wheelchair frame 12 so the axis of rotation of the anti-tipper arm 102 with respect to the housing is disposed above the axis of rotation for the wheelchair front wheels 16.

The anti-tipper arm 102 preferably is configured so the distal end 103 of the anti-tipper arm, when the anti-tipper arm is in the rest position, does not protrude beyond where the footrests would be located when in the footrests are in lowest position. The anti-tipper arm 102 also is configured so that the arm does not interfere with rotation and swiveling of the front wheels 16 when the support arm is in either of the rest or operable positions. The anti-tip device 100 including the anti-tipper arm 102 also is preferably configured to not interfere with the ability to remove the footrests or swing them out of the way.

As with the embodiment described in FIGS. 1A,B, the anti-tipper arm also is configured so the distal end 103 or the wheel(s) 106 located at the distal end is spaced a sufficient distance above the support surface 4 so the distal end or wheel(s) 106 thereat do not come into contact with a part of the support surface during most use of the wheelchair (e.g., do not contact the surface as the wheelchair begins to enter an incline). Reference should be made to the foregoing discussion for FIGS. 1 A,B as to further details regarding the configuring of the anti-tipper arm 102 and the spacing of the distal end 103 or the wheel(s) 106 thereat above the support surface 4.

In alternate embodiments, as illustrated in FIGS. 2A,B, two anti-tip devices 100 can be secured to the wheelchair frame 12 so as to control the maximum amount of forwards tilting. Also, an intermediate member 107 (FIG. 2B) can be secured to the wheelchair frame 12 so an anti-tip device is centrally located so as to control or limit the maximum amount of forwards tilting for wheelchairs without footrests (i.e., for wheelchair users without legs).

Because the anti-tipper arm 102 is rotatably disposed within the housing 104, when the wheelchair 10*a* is moving backwards, a collision between the anti-tipper arm distal end 103 and an obstacle should cause the anti-tipper arm to be rotated forwards and upwards out of the way in most, if not all cases.

Figure 3B:
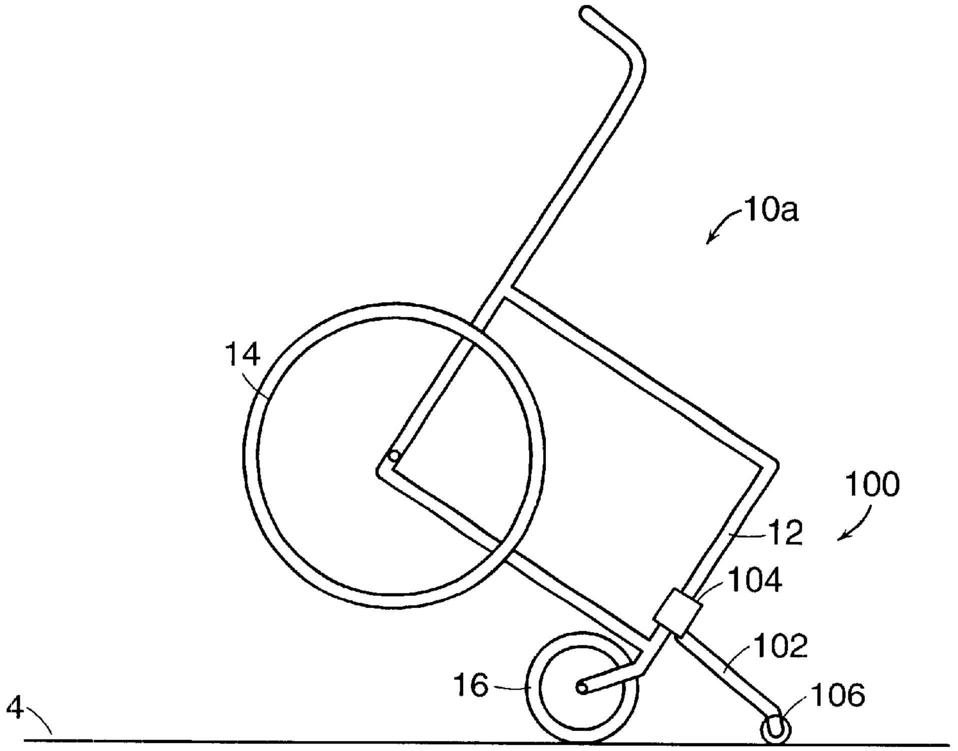
FIG. 3B is another side view of the wheelchair of FIG. 3A when the wheelchair is tilted forwards enough to actuate the anti-tip device.

There is shown in FIG. 3B, another side view of the wheelchair 10*a* when the wheelchair is tilted forwards so the distal end 103 or the wheel(s) 106 thereat is in contact with the support surface 4. When in this condition or position, the anti-tipper arm 102 also is in the operable position.

As explained hereinafter, the anti-tipper arm 102 automatically rotates within the housing 104 of the anti-tip device 100 from the rest position to an operable position in response to the forwards tilting of the wheelchair 10*a*. Preferably after the wheelchair 10*a* has tilted forwards a first amount, an amount less than that required to place the anti-tipper arm 102 in the operable position, the anti-tipper arm or the wheel(s) 106 thereat contact the support surface 4. As the wheelchair 10*s* is tilted further, the anti-tipper arm 102 continues to rotate within the housing and moves forwardly with respect to the wheelchair frame until the anti-tipper arm engages a portion of the housing thereby stopping further rotation and thus putting the anti-tipper arm in the operable position. When the anti-tipper arm 102 is rotated into the operable position, further forwards tilting of the wheelchair 10*a* is prevented, because the distal end or wheel thereat is in contact with the support surface 4 and the anti-tipper arm is engaging the housing 104.

Figure 4A:
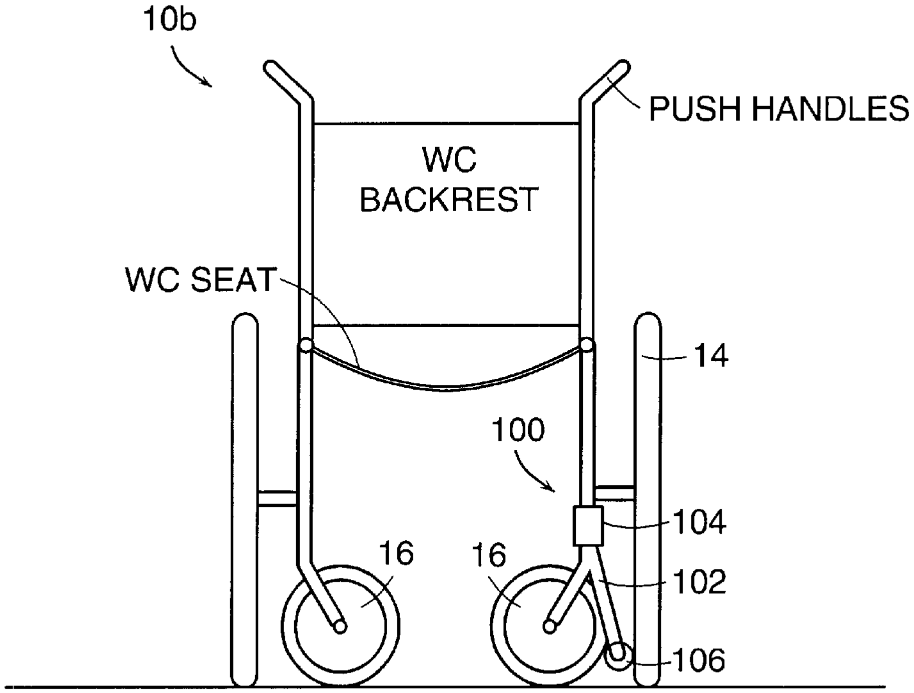
FIG. 4A is a front view of a wheelchair having a sideways extending anti-tip device according to the present invention, when the wheelchair is in the upright position.

As provided above FIGS. 4A,B show the use of one or more anti-tip devices 100 to control or limit the maximum amount of sideways tilting by a wheelchair 10*b*. There is shown in FIG. 4A the wheelchair 10*b* when in an upright position and where an arm, the anti-tipper arm 102, of the anti-tip device 100 is positioned in its rest position. Additionally, the housing 104 for each anti-tip device 100 is mounted to a vertical member of the wheelchair frame 12 so the anti-tipper arm 102 for each device is generally extending outwardly and sideways when in the rest position and so the anti-tipper arm rotates within the housing from the rest position to the operable position responsive to sideways tilting of the wheelchair 10*b*. Preferably, the housing 104 is mounted to the wheelchair frame 12 so the axis of rotation of the anti-tipper arm 102 with respect to the housing is disposed above the axis of rotation for the wheelchair front wheels 16.

The anti-tipper arm 102 preferably is configured so the distal end 103 of the anti-tipper arm, when the anti-tipper arm is in the rest position, does not protrude beyond the rear wheel 14 on a given side of the wheelchair 10*b*. Additional the anti-tip devices 100 including the anti-tipper arms 102 therefore are preferably configured so they do not interfere with the normal use of the front wheels such as rotation and swiveling of the front wheels 16 or the ability to remove the footrests or swing them out of the way.

As with the embodiment described in FIGS. 1A,B, the ant-tipper arm 102 also is configured so the distal end 103 or the wheel(s) 106 located at the distal end is spaced a sufficient distance above the support surface 4 so the distal end or wheel(s) 106 thereat do not come into contact with a part of the support surface during most use of the wheelchair (e.g., do not contact the surface as the wheelchair begins to enter an incline). Reference should be made to the foregoing discussion for FIGS. 1 A,B as to further details regarding the configuring of the anti-tipper arm 102 and the spacing of the distal end 103 or the wheel(s) 106 thereat above the support surface 4.

In a more particular embodiment, a plurality of anti-tip devices 100 are secured the wheelchair frame, at least one anti-tip device for each side of the wheelchair.

Figure 4B:
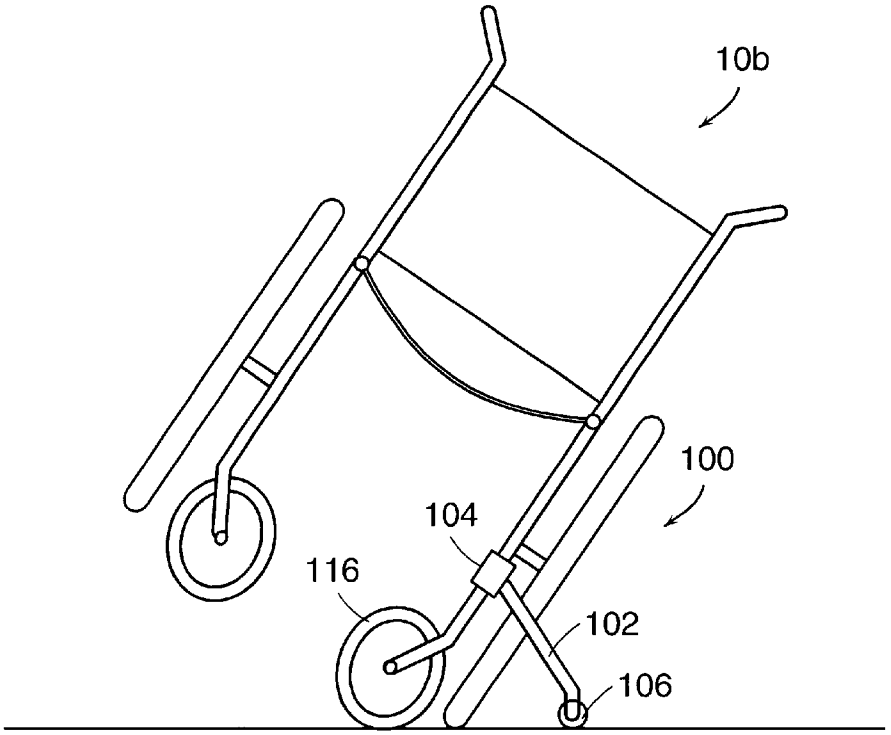
FIG. 4B is another side view of the wheelchair of FIG. 4A when the wheelchair is tilted sideways enough to actuate the anti-tip device.

There is shown in FIG. 4B, another side view of the wheelchair 10*b* when the wheelchair is tilted sideways so the distal end 103 or the wheel(s) 106 thereat is in contact with the support surface 4. When in this condition or position, the anti-tipper arm 102 also is in the operable position.

As explained hereinafter, the anti-tipper arm 102 automatically rotates within the anti-tip device housing 104 from the rest position to an operable position in response to sideways tilting of the wheelchair **10*b*. Preferably after the wheelchair 10*b* has tilted sideways a first amount, an amount less than that required to place the anti-tipper arm 102 in the operable position, the anti-tipper arm or the wheel(s) 106 thereat contact the support surface 4. As the wheelchair 10*b* is tilted further, the anti-tipper arm 102 continues to rotate within the housing and move outwardly and sideways until the anti-tipper arm engages a portion of the housing thereby stopping further rotation and thus putting the anti-tipper arm in the operable position. When the anti-tipper arm 102 is rotated into the operable position, further sideways tilting of the wheelchair 10*b* is prevented, because the distal end or wheel thereat is in contact with the support surface 4 and the anti-tipper arm is engaging the housing 104**.

Figure 5A:
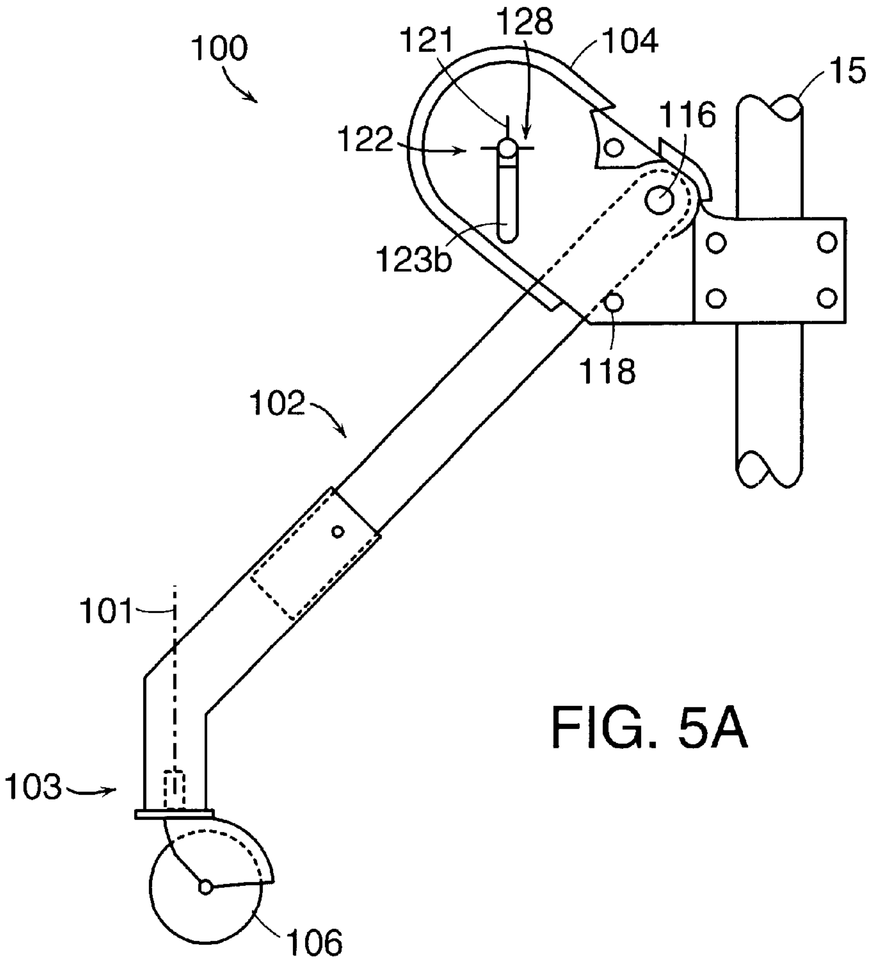
FIG. 5A is a side view of an anti-tip device according to a first embodiment.
Figure 5B:
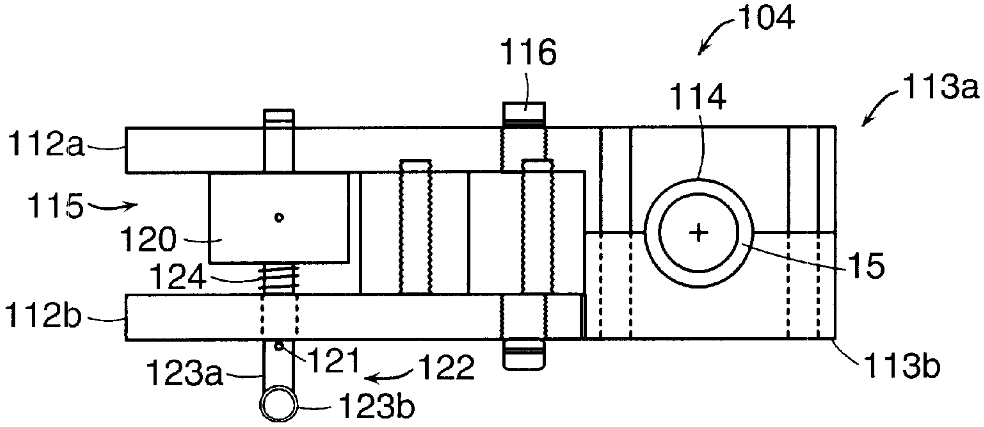
FIG. 5B is a top view of the anti-tip device of FIG. 5A with the support arm removed for clarity.

Referring now to FIGS. 5A,B there is shown an anti-tip device 100 according to a first embodiment of the present invention which anti-tip device includes a housing 104 and an anti-tipper arm 102. In more particular embodiments as described hereinafter, the anti-tip device 100 also includes a wheel 106 that is disposed at a distal end 103 of the anti-tipper arm 102.

The housing 104 includes a first member side member **112*a* and a second side member 112*b* that are removably secured to each other by means of screws or bolts. A first front end 113*a,b* of each of the side members 112*a,b* is configured so a through aperture 114 is formed when the two side members are secured together. The through aperture 114 also is formed or sized such that, when the side members 112*a,b* are secured to each other about the support member, the housing 104 is securely clamped to the support frame member of the apparatus or wheeled conveyance (e.g., wheelchair, bicycle). Essentially, the first ends 113*a,b* of the side members 112*a,b* form two jaws that clamp about the support frame member. It is within the scope of the present invention for the first ends 113*a,b*** to be secured to the support frame member by any of a number of means known in the art such as welding, soldering and adhesives as well as by physically clamping the housing.

In an illustrative exemplary embodiment, the support frame member 15 is a tubular member and the through aperture 114 is configured with a shape that generally complements the support frame member 15, thus the through aperture extending through the housing 104 is circular in cross section. The through aperture also is sized so the housing 104 is securely clamped to the support frame member 15 so the housing is resistive to rotational loads and axial loads imposed when the anti-tipper arm 102 is in contact with the support surface 14 (FIG. 1B).

It is within the scope of the present invention for the through aperture 114 to be configured with a rectilinear (e.g. square) cross-section or a polygonal cross-section for use with a tubular support frame member. Additionally, the surface of through aperture, the surface in contact with the support frame member also can include surface artifacts (e.g., plurality of ridges, nubs) to improve clamping capability as well as to improve the capability of the housing 104 to resist rotational motion about the support frame member.

The remaining portions of the first and second side members **112*a,b* are configured so as to be generally spaced from each other so as to form a pocket 115 there between and in which the anti-tipper arm 102 is rotatably disposed. A pin, first pin 116, passes between the first and second side members 112*a,b* in the pocket 115 and is passed through an aperture 105 (see FIGS. 6 & 8A,B) in the anti-tipper arm 102. In this way, the anti-tipper arm 102 can rotate about the first pin 116 and thus rotate with respect to the housing 104. The first pin 116 also is secured to the housing 104** using any of a number or techniques known to those skilled in the art, for example split rings in grooves located at both ends of the first pin, so the first pin remains in place.

A second pin 118 passes between the first and second members **112*a,b* in the pocket and forms a lower stop for the anti-tipper arm 102. The second pin 118 is positioned so the distal end 103 of the anti-tipper arm 102 is disposed above the support surface 4 (FIG. 1B) the desired amount as described above when the housing 104 is secured to the support frame member 15. As such, when the anti-tipper arm 102 is resting against the second pin 118 and the housing 104 is secured to the frame member 15, the anti-tipper arm is in its rest position. Alternatively, or additionally, the housing 104 can be configured with an internal surface or step which functions as the lower stop for the anti-tipper arm 102**.

As discussed above, when the apparatus or wheeled conveyance is tipped in a given direction, the anti-tipper arm 102 rotates with respect to the housing (i.e., rotates about the first pin 116) so that it moves from the rest position, where the arm is resting against the second pin 118, to the operable position. For the anti-tip device 100 according to the first embodiment, a cam 120 is disposed between the first and second side members **112*a,b* within the pocket 115 and is secured to a handle member 122 that is rotatably mounted to the first and second members 112*a,b*. In an illustrative exemplary embodiment, the cam 120** is secured to the handle member by means of a pin, although it is within the scope of the present invention to use any means known to those skilled in the art for securing a cam to the handle member.

The handle member 122 includes a latch member 121 that extends outwardly and radially from the portion **123*a* of the handle member between the second side member 112*b* and the handle portion 123*b* of the handle member. Also, a spring 124 is disposed about the handle member and between one end of the cam 120 and an inner surface of the second side member 112*b* so as to cause the latch member 121 to be urged against the second side member 112*b*. Additionally, the outer surface of the second side member 112*b* is configured with a plurality of notches to receive and engage the latch member 121. Preferably, the number of notches 128 and their positioning are established so as to correspond with the number of cam surfaces and the relative position of each cam surface. With such an arrangement, a user can select a cam surface by rotating the handle member 122 to one of the notches 128 and then lock-in the selected cam surface by letting the spring draw the latch member 121** into the notch.

Figure 6:
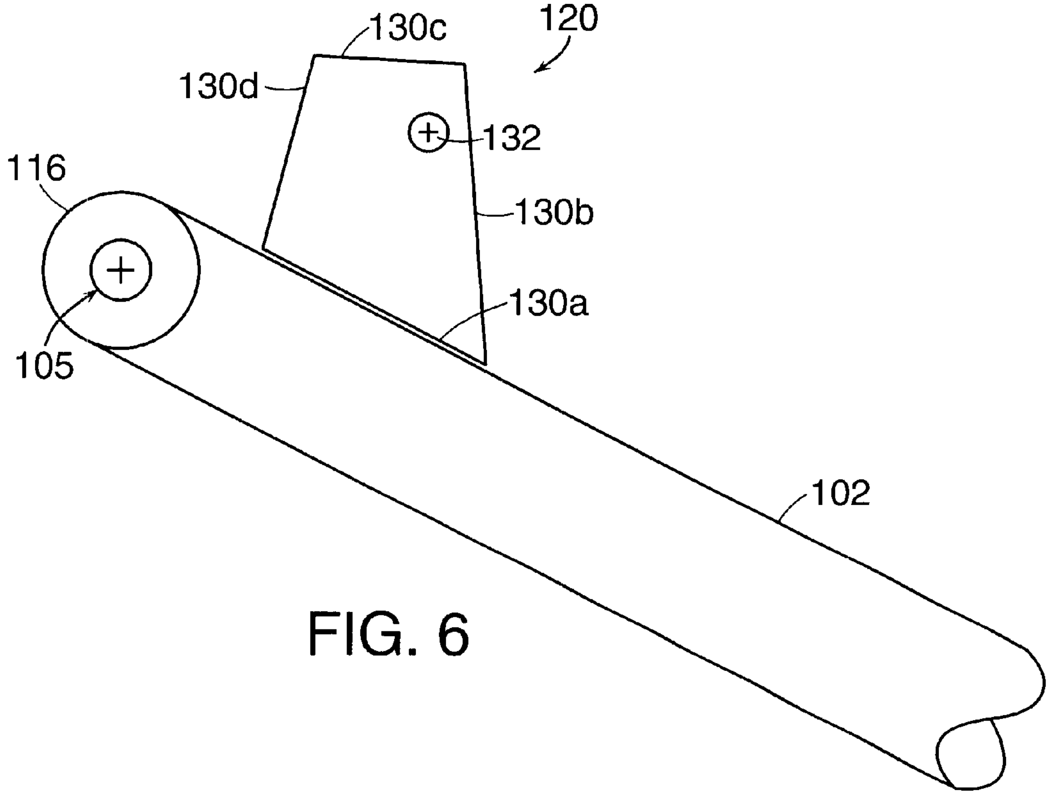
FIG. 6 is a schematic view of a support arm resting against one surface of the cam.

There is shown in FIG. 6 a schematic view of a support arm 102 and a cam 120. As provided above, the anti-tipper arm 102 is rotated about the first pin 116 until a portion of the anti-tipper arm surface contacts a surface **130*a* of the cam 120 as is illustrated in FIG. 6. When the anti-tipper arm 102 contacts the cam surface 130*a*, rotation of the anti-tipper arm about the first pin is stopped. When in this condition, the anti-tipper arm 102** is in its operable position.

As shown in FIG. 6, each of the cam surfaces **130*a–d* is a located at a different distance from the point of rotation 132. As also indicated above, a user can rotate the handle member 122 to select one of the cam surfaces 130*a–d*. Thus, the user by selecting a cam surface also adjusts the amount of rotation that the anti-tipper arm can undergo before it contacts the cam surface to stop further rotation. In other words, the angular distance between the rest and operable position of the anti-tipper arm can be adjusted by selecting a cam surface. In this way, the amount of rotation by the anti-tipper arm 120** is adjustable and thus the maximum amount of tipping by the apparatus or wheeled conveyance also can be adjusted.

Figure 7A:
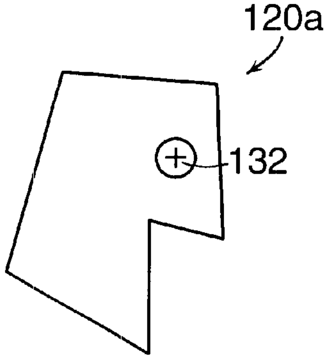
FIGS. 7A,B are side views of illustrative cam profiles for use with the anti-tip device of the present invention.
Figure 7B:
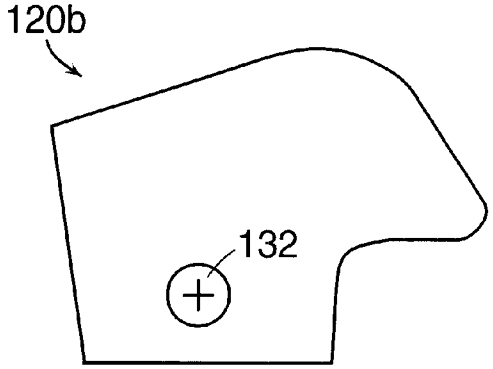

There is shown in FIGS. 7A,B some illustrative alternative profiles of cams 120*a,b* for use with the anti-tip device 100 of the present invention. As with the cam 120 shown in FIG. 6, each of these additional cams 120*a,b* are secured to the handle member 122 so each can be rotated about the point of rotation 132.

Figure 8A:
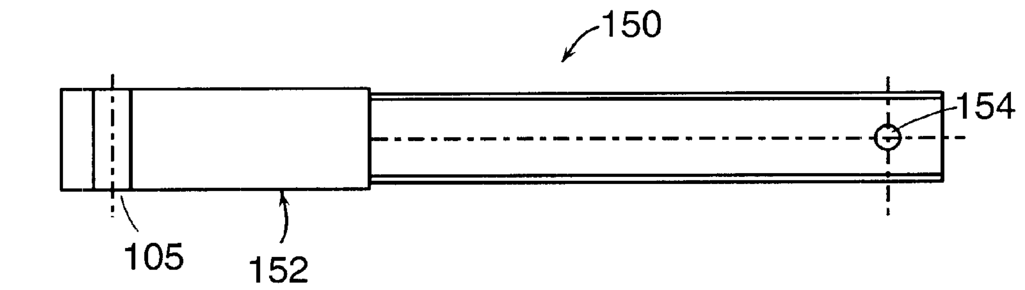
FIGS. 8A,B are top and side, partial cross-section, views of a top member for an alternative embodiment for a support arm.
Figure 8B:
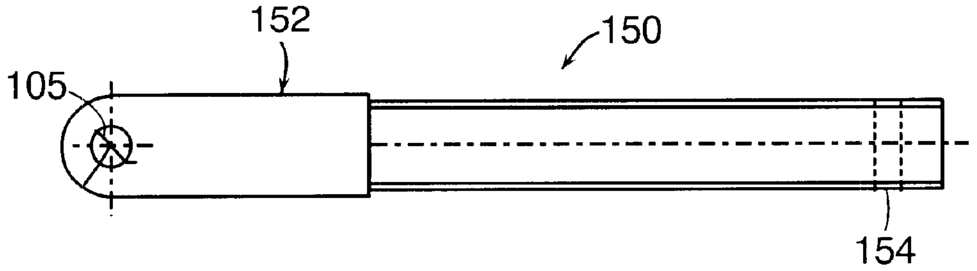
FIG. 8C is a cross-section side view of a bottom member for the alternative support arm embodiment.
Figure 8C:
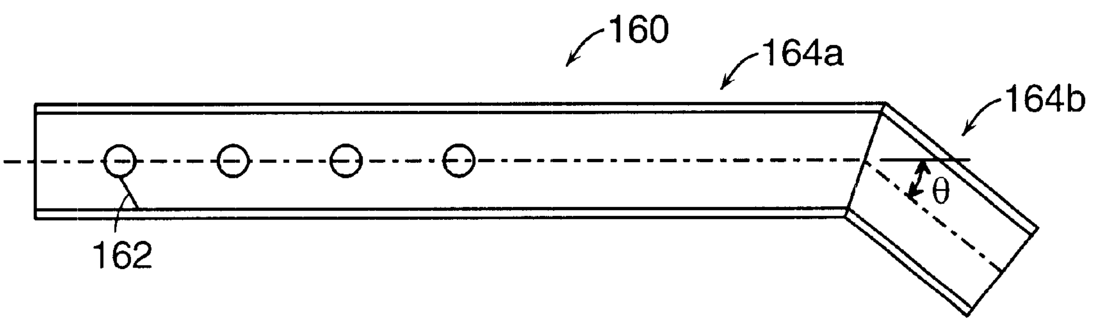

Now referring to FIGS. 8A–C, there is shown an alternative embodiment of an anti-tipper arm 102*a* having an top arm portion 150 and a bottom arm portion 160. The top arm portion 150 includes a shoulder portion 152 including the anti-tipper arm through aperture 105 and an adjustment pin through aperture 154. The shoulder portion 152 is configured so it contacts the cam surface and can be made of a material different than that for the anti-tipper arm 102. The anti-tipper arm through aperture 105 as described above, receives the first pin 116.

The bottom arm portion 160 is a tubular member having an inner diameter larger than the outer diameter of the top arm portion 150 so the top arm portion 150 can be slidably received therein. The bottom arm portion 160 includes a plurality of through apertures 162 arranged so the adjustment pin through aperture 154 can be co-located with one of the bottom portion through apertures 162 and a pin (not shown) can be inserted therein to fix the top and bottom arm portions 150,160 in place. In his way, the length of the anti-tipper arm 102 can be adjusted to suit the particular use or application.

The bottom-portion 160 also includes first and second sections 164*a,b* that are at an angle θ with respect to each other. This angle θ in a particular embodiment of the present invention is established so the swivel axle of a castered wheel assembly would be approximately vertical or generally perpendicular to the support surface 4 (FIG. 1B) when the anti-tipper arm is in the operable position. More specifically, the swivel axle would be in about a vertical condition when the wheel(s) 106 at the anti-tipper arm distal end contact the support surface 4.

Figure 9A:
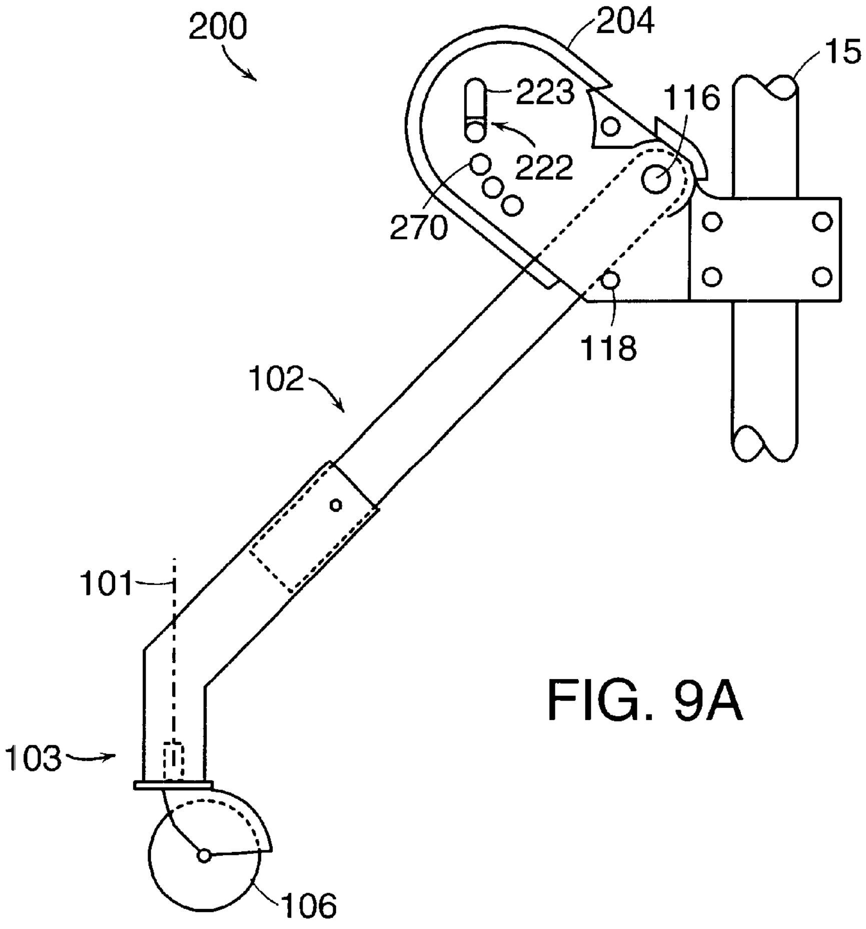
FIG. 9A is a side view of an anti-tip device according to a second embodiment.
Figure 9B:
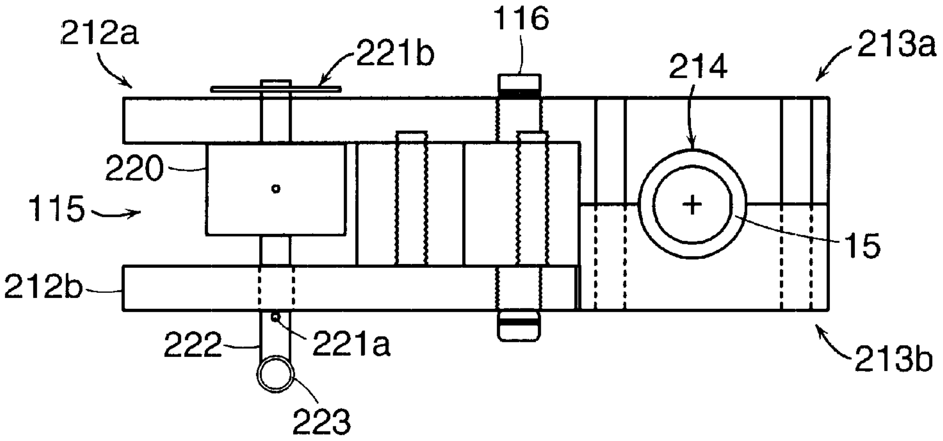
FIG. 9B is a top view of the anti-tip device of FIG. 9A with the support arm removed for clarity.

There is shown in FIGS. 9A,B side and top views respectively of an anti-tip device 200 according to a second embodiment of the present invention. As with the first embodiment, the anti-tip device includes a housing 204, an anti-tipper arm 102 and a wheel(s) 106 at a distal end 103 of the anti-tipper arm. Reference should be made to the foregoing discussion for FIGS. 5A,B for the details regarding construction and arrangement of the distal end 103 and the wheel(s) 106. Reference also should be made to the foregoing discussion for FIGS. 5A,B regarding the details and function of the first and second pins 116,118.

As with the first embodiment, the first ends 213*a,b* of the first and second side members 212*a,b* of the housing are configured so as to provide a through aperture 214 therein. In addition, the support frame member 15 is received within the through aperture 214 so the housing can be secured thereto. Reference should be made to the foregoing discussion regarding the through aperture and means for securing the housing to the support frame member for the first embodiment which applies equally to the second embodiment.

In the second embodiment, a plurality of through apertures 270 are provided in each of the first and second side members 212*a,b* that communicate with the pocket 115 formed there between. The through apertures 270 in the first and second side members 212*a,b* are positioned so the through apertures in one side member 212*a* are co-located axially with the through hole in the other side member 212*b* so as to form plurality of pairs of through apertures 270 in both side members. As illustrated in FIG. 9A, the through apertures 270 in each side member 212*a* are spaced from each other so as to define discrete angular locations from the second pin 118, which defines the rest position of the anti-tipper arm 102. A third pin 222 is removably received in one of the pairs of through apertures 270 provided in the first and second side members 212*a,b* such that a portion of the third pin is disposed in the pocket 115 formed there between.

To prevent axial motion of the third pin 222, two stop pins 221*a,b* are provided that extend outwardly and radially from the third pin 222. The first stop pin 221*a* is positioned between the handle portion 223 and the outer surface of the housing second side member 112*b*. The second stop pin 221*a* is positioned in the portion of the third pin 222 that extends outwardly from the first side member 212*a*. Preferably, the second stop pin 221*b* is configured so as to be removably received in the third pin 222, so the third pin can be selectively re-positioned in any of the plurality of pairs of through apertures 270 in the side members 212*a,b*. This is only illustrative and any other means known to those skilled in the art, for example a spring-ball plunger, can be used.

In the second embodiment, similarly to the first embodiment, the rotation of the anti-tipper arm 102 about the first pin 116 is stopped when a portion of an outer surface of the anti-tipper arm 102 contacts a surface of the portion of the third pin 222 in the pocket 115 between the first and second side members 212*a,b*. Because the third pin 222 can be selectively positioned in any of the plurality of the pairs of through apertures 270, a user can adjust the angular distance between the second and third pins 118, 120 merely by re-positioning the third pin. In this way, a user also can adjust the amount of allowable rotation for the anti-tipper arm 102 and thus the maximum amount of tipping that can be achieved by the apparatus or wheelchair 10 (FIG. 1A).

Alternatively, a stop 220 such as a block of plastic may be removably secured to and about the third pin 222 so as to provide a larger surface upon which the anti-tipper arm 102 can rest against when in the operable position. This larger surface can be substantially flat, arcuate or configured so as to present a complementary surface to the shape of the anti-tipper arm 102. It also is within the scope of the present invention for any of the embodiments described herein for the first and side members of the housing to be configured with a plurality of through apertures for removably receiving the second pin 118. In this way, the rest position of the anti-tipper arm also can be adjusted in a similar fashion as the third pin 222 of the second embodiment.

Figure 10A:
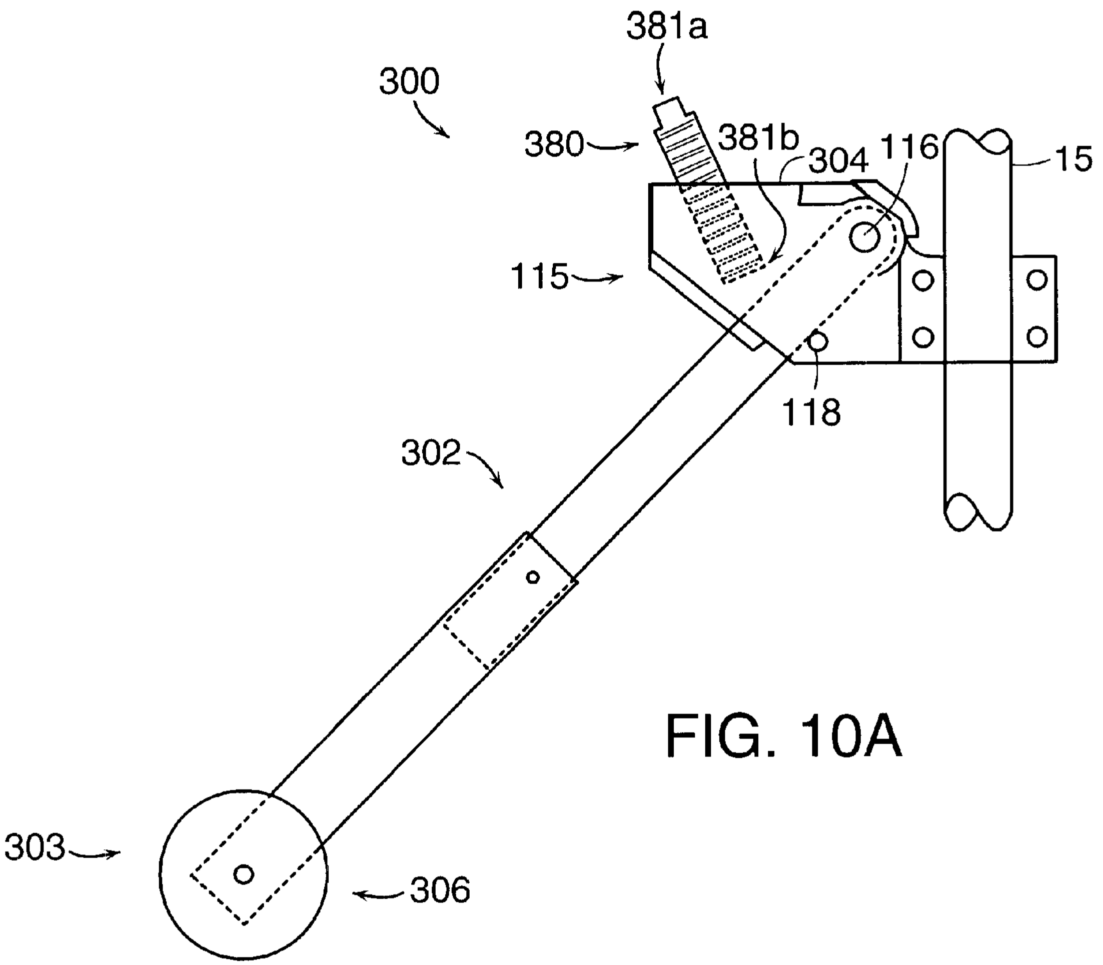
FIG. 10A is a side view of an anti-tip device according to a third embodiment.
Figure 10B:
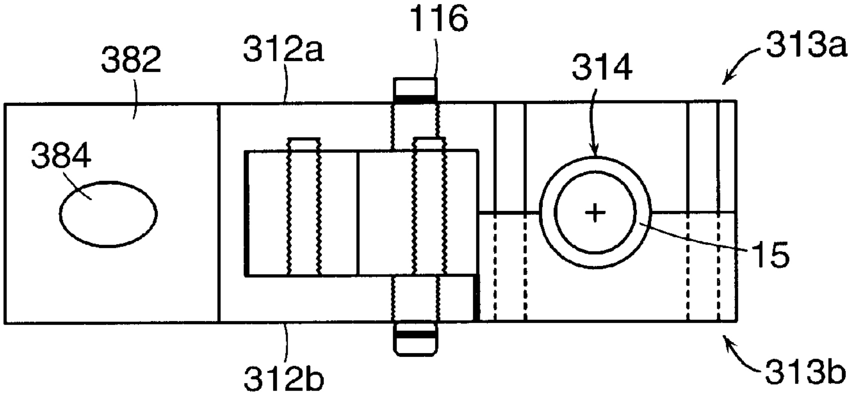
FIG. 10B is a top view of the anti-tip device of FIG. 10A with the support arm removed for clarity.

There is shown in FIGS. 10A,B side and top views respectively of an anti-tip device 300 according to a third embodiment of the present invention. As with the first embodiment, the anti-tip device includes a housing 304, anti-tipper arm 302 and a plurality of wheels 306 at a distal end 303 of the anti-tipper arm. Reference should be made to the foregoing discussion for FIGS. 5A,B regarding the details and function of the first and second pins 116,118.

As with the first embodiment, the first ends 313*a,b* of the first and second side members 312*a,b* of the housing are configured so as to provide a through aperture 314 therein.

In addition, the support frame member 15 is received within the through aperture 314 so the housing can be secured thereto. Reference should be made to the foregoing discussion regarding the through aperture and means for securing the housing to the support frame member for the first embodiment which apply equally to the second embodiment.

As with the first embodiment, the anti-tipper arm 302 is rotatably secured to the first pin 116 so that the anti-tipper arm can rotate from the rest position established by the second pin 118 to the operable position. There is shown in FIG. 10A an alternative arrangement for an anti-tipper arm 302 where the arm is substantially straight and configured so the long axis thereof extends along a radial from the center of rotation. Additionally,; the anti-tipper arm 302 is configured so two or more wheels 306 are disposed at the distal end 303 of the anti-tipper arm. The wheels 306 may be fixed so they rotate about a common axis or may swivel like the wheels 106 shown in any of FIGS. 1–5. It also should be recognized that the anti-tipper arm 102 for any of the embodiments shown in FIGS. 1–5, can be configured like the anti-tipper arm 302 shown in FIG. 10A and the wheels located at the distal end thereof as shown in FIG. 10A.

The housing 304 includes a plate member 382 that extends between the first and second side members 312*a,b*, which plate member includes a threaded though aperture 384. The threaded through aperture 384 is arranged so as to communicate with the pocket 115 defined by the first and second members 312*a,b* and in which the anti-tipper arm rotates. A threaded member 380, such as a cap screw, is threadably disposed within the threaded aperture 384 so that a second end 381*b* of the threaded member is disposed within the pocket 115 and so the first end 381*a* is disposed external to the housing.

The first end 381*a* also includes any of a number of means known to those skilled in the art, such as a hex head or a handle of ergonomic construction, that would allow a user to rotate the threaded member in either of a clockwise or counterclockwise direction. When the threaded member 380 is rotated in one direction (e.g., clockwise), the second end 381*b* thereof is moved away from the back surface of the plate member 382 and further into the pocket 115. Correspondingly, when the threaded member is rotated in the other direction, then the second end 381*b* is moved towards the back surface of the plate member 382.

In the third embodiment, similarly to the first and second embodiments, the rotation of the anti-tipper arm 302 about the first pin 116 is stopped when a portion of an outer surface of the anti-tipper arm 302 contacts a surface of the second end 381*b* of the threaded member 380 in the pocket 115 between the first and second side members 312*a,b*. Because the threaded member second end 381*b* can be selectively positioned with respect to the back surface of the plate member 382 by rotating the threaded member, a user can adjust the angular distance between the second pin 118 and the threaded member second end by rotating the threaded member in either a clockwise or counterclockwise direction. In this way, a user also can adjust the amount of allowable rotation for the anti-tipper arm 302 and thus the maximum amount of tipping that can be achieved by the apparatus or wheelchair 10 (FIG. 1A).

Alternatively, an end cap or secondary member can be secured to the threaded member second end 381*b*, like that done with the second embodiment, so as to provide a larger surface for the anti-tipper arm 302 to rest against when the arm is in the operable position. This larger surface can be substantially flat, arcuate or configured so as to present a complementary surface to the shape of the anti-tipper arm 302. It also is within the scope of the present invention for any of the embodiments described herein, that the above-described angle adjusting means of the third embodiment to be used to adjust the angular location of the anti-tipper arm rest position in a similar fashion.

Figure 11A:
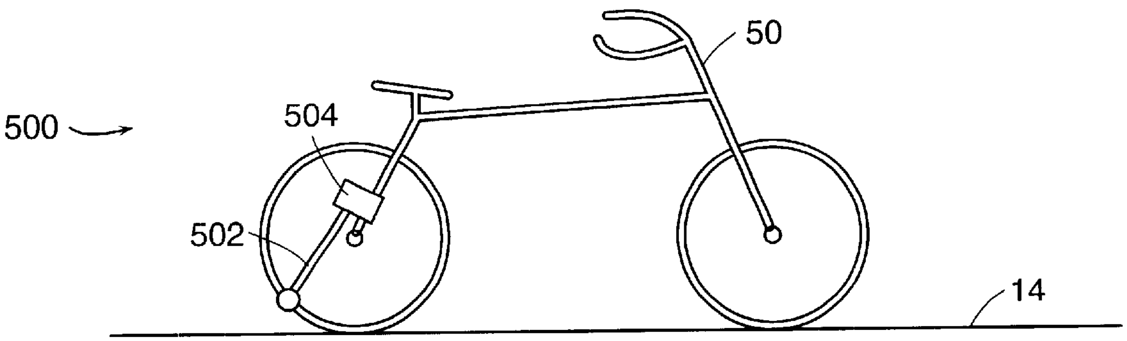
FIG. 11A is a side view of a bicycle having a rearwardly extending anti-tip device according to the present invention, when the bicycle is in the upright position.

In another aspect of the present invention, there is shown in FIGS. 11A,B an anti-tip device 500 in accordance with the present invention for use with a wheeled conveyance such as a bicycle 50 to control the maximum amount of backwards tilting and/or as an aid in performing a wheelie. As with the other above described aspects of the present invention, the anti-tip device 500 includes a housing 504 and an anti-tipper arm 502 that is rotatably disposed within the housing. The housing 504 is attached or secured to the frame of the bicycle using any of a number of available techniques, for example clamping, and preferably so the axis of rotation for the anti-tipper arm 502 is disposed above the axis of rotation for the bicycle's rear wheel.

As shown in FIG. 11A, when the bicycle is the normal upright condition, the anti-tipper arm 502 is arranged so that it does not extend beyond the rearmost aspects of the rear wheel. Additionally, when the anti-tipper arm 502 is in the rest position, the distal end thereof is spaced from the support surface 4 a sufficient distance so the distal end of the arm or the wheel(s) thereat do not generally contact objects upon the support surface or the support surface during normal usage of the bike.

Figure 11B:
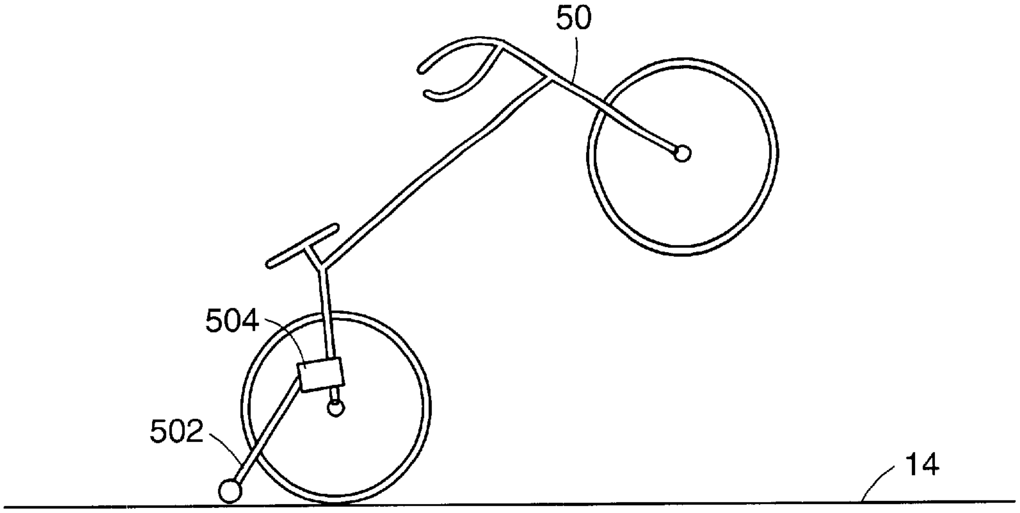
FIG. 11B is another side view of the bicycle of FIG. 11A when the user is popping a wheelie and the anti-tip device is in its operable position.

There is shown in FIG. 11B another side view of the bicycle 50 when it is tilted backwards such as when a user is performing a wheelie. In this configuration, the anti-tipper arm 502 rotates from the rest position to the operable position. As described above, in the operable position, further tilting of the bicycle is prevented and the user is balanced upon the rear wheel and the anti-tip device 500 (i.e., the anti-tipper arm 502). In an alternative embodiment, two such anti-tip devices are secured to the bicycle on either side of the rear wheel. Reference is made to U.S. Pat. No. 5,330,221, the teachings of which are incorporated herein by reference for an illustrative construction and structural arrangement for a bicycle.

Although a specific construction of an anti-tip device is not described herein for the application involving a bicycle, it is contemplated that any of the anti-tip devices, and the alternative components and structures therefore, described above in connection with FIGS. 5–10 can be used for controlling the maximum amount of backwards tilting of the bicycle, as well as tilting in other directions, for example sideways tilting.

The housing, anti-tipper arm, pins, threaded member, and handle member of the above-described embodiments, in an exemplary embodiment, are constructed from a metal such as aluminum or steel and the cam is constructed from a plastic material. It is within the scope of the present invention, however, for the components comprising the anti-tip devices of the present invention to be constructed from any material available to those skilled in the art which is capable of sustaining the loads and forces imposed thereon by normal use of the anti-tip device.

Although a preferred embodiment of the invention has been described using specific terms, such description is for illustrative purposes only, and it is to be understood that changes and variations may be made without departing from the spirit or scope of the following claims. For example, the forgoing describes the use of the anti-tip device with a number of wheeled conveyances, however, it is within the scope of the present invention for the anti-tip device to be used with other apparatus and devices which individuals have a history of tipping on one of a backwards, forwards or sideways direction.

What is claimed is:

1. An anti-tip device for an apparatus having a support structure, the anti-tip device comprising:

a housing secured to the apparatus support structure;

a support arm being rotatably secured to the housing and having a distal end remote from the housing;

wherein the housing is configured so the support arm is in one of a rest position or an operable position, where the rest position corresponds to a non-tipped condition of the apparatus;

wherein the support arm rotatably moves from the rest position responsive to tipping of the apparatus and is rotated so as to be in the operable position when the apparatus is tipped a predetermined amount;

wherein the operable position tipping of the apparatus is essentially stopped and the support arm distal end is in contact with a support surface; and wherein the housing includes an adjusting mechanism for selectively adjusting an angular distance between the rest position and the operable position, wherein the adjusting mechanism includes a cam rotatably disposed within the housing so a surface thereof contacts a surface of the support arm when in the operable position.

2. The anti-tip device of claim 1, wherein the apparatus is a wheelchair and wherein the housing is secured to a support structure of the wheelchair so as to control the tipping of the wheelchair in one of a rearward, forward and sideways direction.

3. The anti-tip device of claim 1, wherein the support arm includes first and second portions that are at an angle with respect to each other, the angle there between being established so the second portion, which includes the support arm distal end, is essentially perpendicular to the support surface when the support arm is in the operable position.

4. In combination with a wheeled conveyance having at least one rear wheel and a support frame, an anti-tip device composing:

a housing secured to the support frame;

a support arm being rotatably secured to the housing and having a distal end remote from the housing;

wherein the housing is configured so the support arm is in one of a rest position or an operable position, where the rest position corresponds to an upright condition of the wheeled conveyance;

wherein the support arm rotatably moves from the rest position responsive to tipping of the wheeled conveyance from the upright condition in one of a rearward, forward and sidedways direction and is rotated so as to be in the operable position when the wheeled conveyance is tipped a predetermined amount;

wherein in the operable the support arm distal end is in contact with a support surface; and wherein the housing includes an adjusting mechanism for selectively adjusting an angular distance between the rest position and the operable position, wherein the adjusting mechanism includes a cam rotatably disposed within the housing so a surface thereof contacts a surface of the support arm when in the operable position.

5. The anti-tip device of claim 4 wherein the adjusting mechanism further includes a rotating mechanism to selectively rotate the cam, the cam having a profile so as to define a plurality of surfaces, each of the plurality of surfaces being differently spaced from the axis of rotation of the cam.

6. The anti-tip device of claim 4, wherein the support arm includes a wheel disposed at the distal end.

7. The anti-tip device of claim 4, wherein the support arm further includes means for varying a length between an axis of rotation of the support arm and the distal end.

8. The anti-tip device of claim 4, wherein the housing is secured to the wheeled conveyance support frame so an axis of rotation for the support arm is positioned vertically above an axle for the at least one rear wheel.

9. The anti-tip device of claim 4, wherein the support arm and housing are configured so the support arm distal end does not extend beyond a rearmost aspect of the at least one rear wheel when the support arm is in the rest position.

10. The anti-tip device of claim 4, wherein the support arm includes first and second portions that are at an angle with respect to each other, the angle there between being established so the second portion, which includes the support arm distal end, is essentially perpendicular to the support surface when the support arm is in the operable position.

11. A wheelchair comprising a support frame, two rear wheels, two front wheels, a seat affixed to the support frame and at least one anti-tip device for controlling an amount of tipping by the wheelchair in one of a backward, forward and sideways direction, wherein each of said at least one anti-tip device comprises:

a housing member being secured to the support frame;

a support arm being rotatable secured to the housing and having a distal end remote from the housing;

wherein the housing is configured so the support arm is in one of a rest position and an operable position, where the rest position corresponds to a non-tipped condition of the wheelchair;

wherein the support arm rotatably moves from the rest position responsive to tipping of the wheelchair from vertical and is rotated so as to be in the operable position when the wheelchair is tipped a predetermined amount;

wherein in the operable position the support arm distal end is in contact with a support surface; and wherein the housing includes an adjusting mechanism for selectively adjusting an angular distance between the rest position and the operable position, the adjusting mechanism including a cam rotatably disposed within the housing so a surface thereof contacts a surface of the support arm when in the operable position.

12. The wheelchair of claim 11, wherein the support arm and housing is secured to the support frame so an axis of rotation for the support arm is positioned vertically above an axle for the rear wheels.

13. The wheelchair of claim 11, wherein the support arm and housing are configured so the support arm distal end does not extend beyond a rearmost aspect of the rear wheels when the support arm is in the rest position.

14. The wheelchair of claim 13, wherein the support arm and housing are configured so the support arm distal end extends beyond the rearmost aspect of the rear wheels when the support arm is in the operable position.

15. The wheelchair of claim 11 wherein the adjusting mechanism further includes a rotating mechanism to selectively rotate the cam, the cam having a profile so as to define a plurality of surfaces, each of the plurality of surfaces being differently spaced from the axis of rotation of the cam.

16. The wheelchair of claim 15, wherein the rotating mechanism is configured so as to be controllable by a user when seated in the wheelchair.

17. The wheelchair of claim 11, further comprising two anti-tip devices.

18. The wheelchair device of claim 17, wherein said anti-tip devices control the amount of tipping in one of a backward and forward direction and wherein the housing for each of said two anti-tip devices is secured to the support frame so there is one anti-tip device proximate one of each rear wheel or each front wheel.

19. The wheelchair device of claim 17, wherein said anti-tip devices control the amount of tipping in a backward direction and wherein the housing for each of said two anti-tip devices is secured to the support frame so is one anti-tip device proximate each rear wheel.

20. The wheelchair of claim 11, wherein the support arm includes first and second portions that are at an angle with respect to each other, the angle there between being established so the second portion, which includes the support arm distal end, is essentially perpendicular to the support surface when the support arm is in the operable position.

21. An anti-tip device for an apparatus having a support structure, the anti-tip device comprising:

a housing secured to the apparatus support structure;

a support arm being rotatably secured to the housing and having a distal end remote from the housing;

wherein the housing is configured so the support arm is in one of a rest position or an operable position, where the rest position corresponds to a non-tipped condition of the apparatus;

wherein the support arm rotatably moves from the rest position responsive to tipping of the apparatus and is rotated so as to be in the operable position when the apparatus is tipped a predetermined amount and when in the operable position tipping of the apparatus is essentially stopped and the support arm distal end is in contact with a support surface; and an adjusting mechanism to selectively adjust an angular distance between the rest position and operable position, thereby adjusting the predetermined amount, wherein the adjusting mechanism includes:

a cam rotatably disposed within the housing, the cam having a profile so as to define a plurality of surfaces, each of the plurality of surfaces being differently spaced from an axis of rotation of the cam; and a rotating mechanism to selectively rotate the cam so one of the plurality of surfaces contacts a surface of the support arm when in the operable position.

22. The anti-tip device of claim 21, wherein the support arm includes a wheel disposed at the distal end.

23. The anti-tip device of claim 21, wherein the support arm further includes means for varying a length between an axis of rotation of the support arm and the distal end.

24. The anti-tip device of claim 21, wherein the housing is secured to the apparatus support structure so an axis of rotation for the support arm is positioned vertically above a specified point of the apparatus.

* * * * *